US009923183B2

(12) United States Patent
Choi et al.

(10) Patent No.: US 9,923,183 B2
(45) Date of Patent: Mar. 20, 2018

(54) BUSBAR MODULE

(71) Applicant: SAMSUNG SDI CO., LTD., Yongin-si, Gyeonggi-do (KR)

(72) Inventors: Hong-Keun Choi, Yongin-si (KR); Mincheol Bae, Yongin-si (KR); Ik-Jae Jeong, Yongin-si (KR); Kyoung-Hwan Noh, Yongin-si (KR); Jiho Lee, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 182 days.

(21) Appl. No.: 14/600,415

(22) Filed: Jan. 20, 2015

(65) Prior Publication Data

US 2015/0221921 A1 Aug. 6, 2015

(30) Foreign Application Priority Data

Feb. 4, 2014 (KR) ........................ 10-2014-0012438

(51) Int. Cl.
*H01M 2/22* (2006.01)
*H01M 2/20* (2006.01)
*H01R 9/24* (2006.01)
*H01M 2/30* (2006.01)
*H01R 31/08* (2006.01)

(52) U.S. Cl.
CPC ............. *H01M 2/202* (2013.01); *H01M 2/30* (2013.01); *H01R 9/2458* (2013.01); *H01R 31/085* (2013.01)

(58) Field of Classification Search
CPC ........ H01M 2/202; H01M 2/30; H01M 2/206; H01M 2/342; H01M 2/305; H01M 2/22; H01M 2/24; H01R 33/00; H01R 31/085; H01R 9/2458

See application file for complete search history.

(56) References Cited

U.S. PATENT DOCUMENTS 3,831,129 A * 8/1974 Frey ..................... H01R 9/2458
439/513
5,985,480 A * 11/1999 Sato ...................... H01M 2/206
429/158

(Continued)

FOREIGN PATENT DOCUMENTS

KR 10-2007-0080871 A 8/2007
KR 10-2012-0125874 A 11/2012

*Primary Examiner* — Stephen Yanchuk
(74) *Attorney, Agent, or Firm* — Lee & Morse, P.C.

(57) ABSTRACT

A busbar module connects a first cell and a second cell adjacent to the first cell, arranged in a first direction and each having first and second electrode terminals spaced apart in a second direction normal to the first direction. The busbar module includes a busbar that electrically connects a first electrode terminal of the first cell and a second electrode terminal of the second cell to each other, and an insulating portion that accommodates the busbar. The busbar includes a first recessed mounting portion, the first recessed mounting portion and a protruding shape of the first electrode terminal having interfitting shapes and a second recessed mounting portion, the second recessed mounting portion and a protruding shape of the second electrode terminal having interfitting shapes, the first and second mounting portions, being slideably coupleable with the first and second electrode terminals.

14 Claims, 5 Drawing Sheets

(56) References Cited

U.S. PATENT DOCUMENTS

| | | | | |
|---|---|---|---|---|
| 9,142,823 B2* | 9/2015 | Moon | .................... | H01M 2/202 |
| 2008/0124617 A1* | 5/2008 | Bjork | .................... | H01M 2/204 |
| | | | | 429/90 |
| 2009/0253034 A1* | 10/2009 | Nedelec | .............. | H01M 2/0285 |
| | | | | 429/181 |
| 2011/0159353 A1* | 6/2011 | Byun | .................... | H01M 2/206 |
| | | | | 429/160 |
| 2012/0058383 A1* | 3/2012 | Hashizaki | ............. | H01M 2/202 |
| | | | | 429/158 |
| 2012/0251873 A1* | 10/2012 | Miyawaki | ............... | H01M 2/34 |
| | | | | 429/178 |
| 2012/0288744 A1* | 11/2012 | Guen | .................... | H01M 2/206 |
| | | | | 429/158 |
| 2013/0260611 A1* | 10/2013 | Ahn | .................... | H01M 2/1077 |
| | | | | 439/627 |
| 2013/0309539 A1* | 11/2013 | Yoshioka | ............... | H01G 11/52 |
| | | | | 429/99 |
| 2014/0308568 A1* | 10/2014 | Kim | ........................ | H01M 2/30 |
| | | | | 429/158 |

* cited by examiner

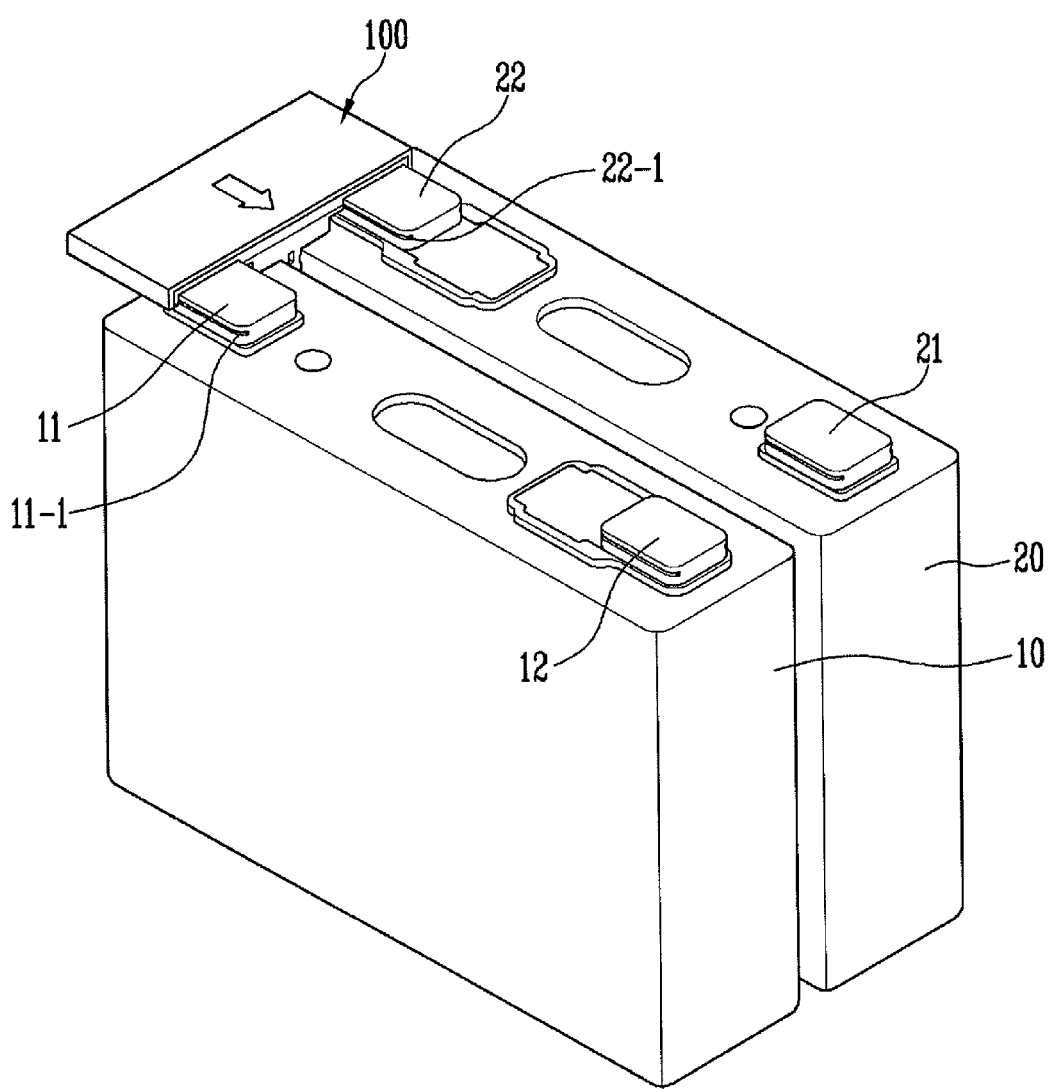

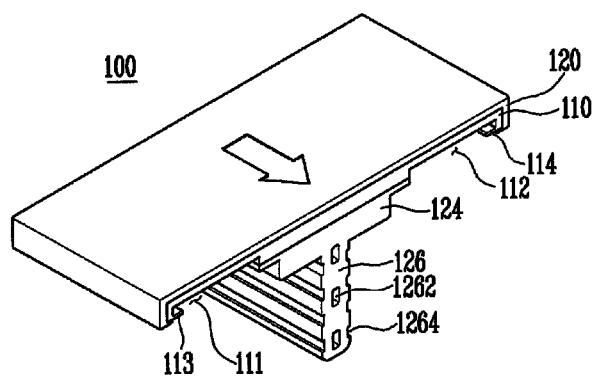
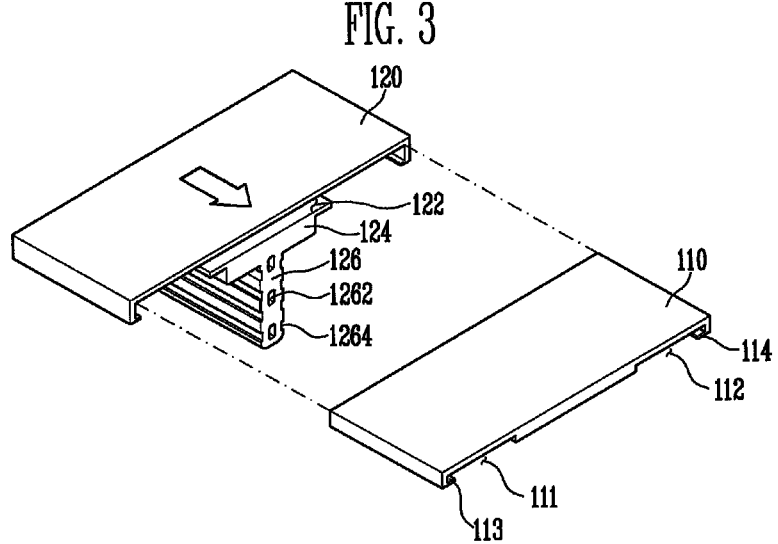

US 9,923,183 B2

BUSBAR MODULE

CROSS-REFERENCE TO RELATED APPLICATION

The present application claims priority under 35 U.S.C. § 119 to Korean Patent Application No. 10-2014-0012438, filed on Feb. 4, 2014, in the Korean Intellectual Property Office, and entitled: "Busbar Module," which is incorporated by reference herein in its entirety.

BACKGROUND

1. Field

An aspect relates to a busbar module.

2. Description of the Related Art

A power supply device includes a battery cell assembly configured with a plurality of battery cells each having a positive electrode at one end thereof and a negative electrode at the other end thereof. The plurality of battery cells are connected in series to one another so as to obtain a required voltage.

SUMMARY

Embodiments are directed to a busbar module that connects a first cell and a second cell adjacent to the first cell, arranged in a first direction and each having first and second electrode terminals spaced apart in a second direction normal to the first direction. The busbar module includes a busbar that electrically connects a first electrode terminal of the first cell and a second electrode terminal of the second cell to each other, and an insulating portion that accommodates the busbar. The busbar includes a first recessed mounting portion, the first recessed mounting portion and a protruding shape of the first electrode terminal having interfitting shapes and a second recessed mounting portion, the second recessed mounting portion and a protruding shape of the second electrode terminal having interfitting shapes, the first and second mounting portions, being slideably coupleable with the first and second electrode terminals.

The first and second mounting portions may be slideably coupleable with the first and second electrode terminals in a direction parallel to the second direction.

The insulating portion may include a spacer that extends between the first cell and the second cell.

The insulating portion may further include a horizontal member that contacts a top surface of the first cell and a top surface of the second cell between the first electrode terminal of the first cell and the second electrode terminal of the second cell.

The spacer may extend from the horizontal member to maintain a predetermined interval between the first cell and the second cell.

The spacer may include at least one through-hole that extends through the spacer from an outside of the first cell and the second cell to a space between the first cell and the second cell defined by the predetermined interval.

The spacer may include at least one through-groove that extends on an outer surface of the spacer from an outside of the first cell and the second cell to an space between the first cell and the second cell defined by the predetermined interval.

The spacer may be positioned between the first mounting portion and the second mounting portion.

The first mounting portion may be slideably coupleable with a side of the first electrode terminal that is farthest from the second electrode terminal. The second mounting portion may be slideably coupleable with a side of the second electrode terminal that is farthest from the first electrode terminal.

The first mounting portion may include a first guide portion that slidingly engages a first guide groove at the side of the first electrode terminal. The second mounting portion may include a second guide portion that slideably engages a second guide groove at the side of the second electrode terminal.

The busbar may further include a stopping portion at an end of at least one of the first mounting portion and the second mounting portion to limit sliding of the first guide portion relative to the first guide groove and sliding of the second guide portion relative to the second guide groove.

At least one surface of the first guide portion or the second guide portion may include a plurality of fixing projections.

The insulating portion may include a covering portion that covers an outer surface of the busbar.

The busbar may be in an accommodating groove between the covering portion and the horizontal member.

Embodiments are also directed to a battery module including at least a first cell and a second cell arranged in a first direction, the first cell and the second cell each having first and second electrode terminals, spaced apart in a second direction, and a busbar module connecting a first electrode terminal of the first cell and a second electrode terminal of the second cell. The busbar module includes a busbar that electrically connects a first electrode terminal of the first cell and a second electrode terminal of the second cell to each other and an insulating portion coupled with the busbar, the insulating portion including a spacer that extends between the first cell and the second cell.

The first electrode terminal may include a first guide groove at a side of the first electrode terminal facing away from the second electrode terminal, the first guide groove extending in a second direction, the second direction being perpendicular to the first direction and parallel to a top surface of the first cell. The second electrode terminal may include a second guide groove at a side of the second electrode terminal facing away from the first electrode terminal, the second guide groove extending in the second direction. The busbar may include a first mounting portion including a first concave portion having a first guide portion that slidingly engages first guide groove, and a second mounting portion including a second concave portion having a second guide portion that slidingly engages second guide groove, such that the busbar module is slidingly coupleable with the first cell and the second cell by sliding the busbar in the second direction.

The insulating portion may further include a horizontal member that extends in the first direction between the first electrode terminal of the first cell and the second electrode terminal of the second cell and contacts the top surface of the first cell and the top surface of the second cell.

The spacer may extend from the horizontal member in a third direction perpendicular to the first direction and the second direction to maintain a predetermined interval between the first cell and the second cell.

Embodiments are also directed to a busbar module including a busbar including a first recessed mounting portion and a second recessed mounting portion spaced apart at bottom thereof, and an insulating portion coupled with the busbar, the insulating portion including a spacer that extends downwardly in a direction away from the bottom of the busbar, the spacer being made of an insulating material.

The busbar may be made of a conductive material and may include guide portions at ends of the bottom of the busbar and a middle portion between the first and second recessed mounting portions, the middle portion being stepped from the first and second recessed mounting portions. The insulating portion may include an upper insulating portion that covers a top surface of the busbar and a lower insulating portion that covers the middle portion of the bottom of the busbar, the spacer extending from the lower insulating portion. The spacer may include at least one through-hole that extends through the spacer or at least one through-groove that extends on an outer surface of the spacer.

BRIEF DESCRIPTION OF THE DRAWINGS

Features will become apparent to those of skill in the art by describing in detail exemplary embodiments with reference to the attached drawings in which:

FIGS. 1A and 1B illustrate perspective views showing states before and after a busbar module is mounted to battery cells according to an embodiment.

FIG. 2 illustrates a perspective view of the busbar module according to the embodiment.

FIG. 3 illustrates an exploded perspective view of the busbar module according to the embodiment.

DETAILED DESCRIPTION

Figure 1B:
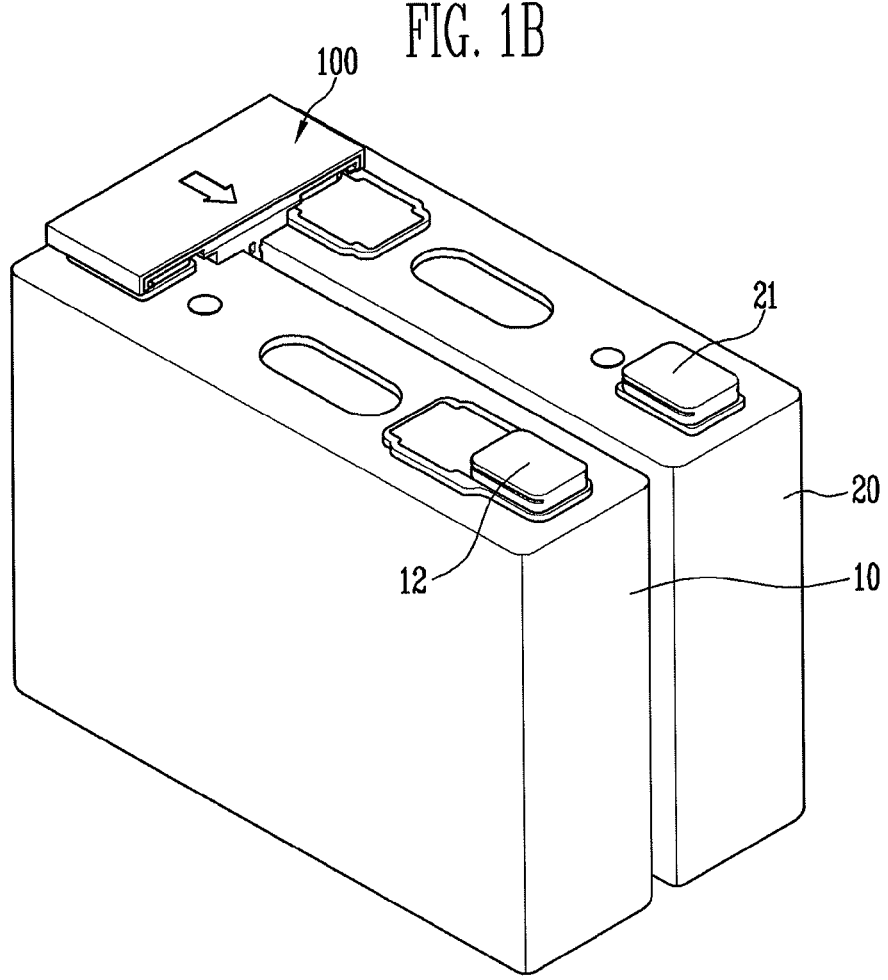

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Generally, a secondary battery has a structure in which an electrode assembly formed by winding a positive electrode, a negative electrode and a separator in a jelly-roll shape is inserted inside a case through an opening of the case, and the opening is covered with a cap assembly.

A collector plate is mounted at an end portion of the electrode assembly. The collector plate is electrically connected to a terminal unit provided to the cap assembly.

If an external terminal is connected to the terminal unit of the cap assembly, current generated in the electrode assembly is supplied to the external terminal via the collector plate and the terminal unit of the cap assembly.

FIGS. 1A and 1B illustrate perspective views showing states before and after a busbar module 100 is mounted to battery cells 10 and 20 according to an embodiment.

Figure 4:
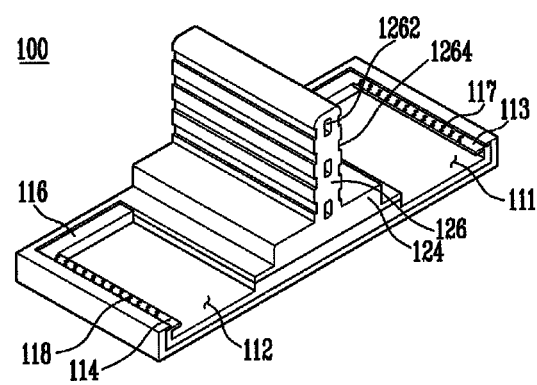
FIG. 4 illustrates a perspective view of the busbar module viewed from the bottom according to the embodiment.
Figure 5:
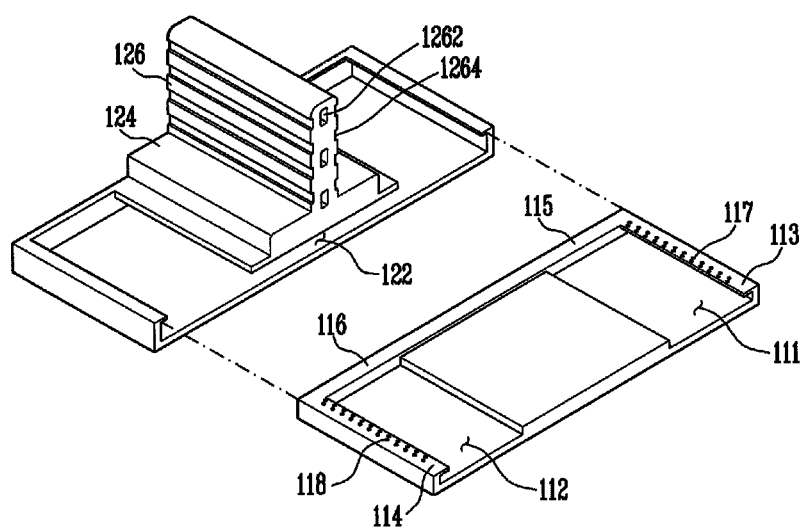
FIG. 5 illustrates an exploded perspective view of the busbar module viewed from the bottom according to the embodiment.

FIG. 2 illustrates a perspective view of the busbar module 100 according to the embodiment. FIG. 3 illustrates an exploded perspective view of the busbar module 100 according to the embodiment. FIG. 4 illustrates a perspective view of the busbar module 100 viewed from the bottom according to the embodiment. FIG. 5 illustrates an exploded perspective view of the busbar module 100 viewed from the bottom according to the embodiment.

As shown in FIGS. 1 to 5, the busbar module 100 according to this embodiment includes electrically connects first and second cells 10 and 20 to each other, and includes a busbar 110 and an insulating portion 120.

The cell 10 or 20 may include various types of battery cells, e.g., a primary battery, a secondary battery, or the like. Herein, it is assumed that, for convenience of illustration, the cell 10 or 20 is a secondary battery. The cell 10 or 20 may include various secondary batteries including a lithium secondary battery.

The first cell 10 may include an electrode assembly and electrode terminals 11 and 12, and the second cell 20 may include an electrode assembly and electrode terminals 21 and 22.

The electrode assembly may include a positive electrode, a separator, and a negative electrode. The electrode assembly may be accommodated in the cell 10 or 20 in a state in which the electrode assembly is formed as a winding type or stacking type.

The electrode terminals 11 and 12 or 21 and 22 may be connected to the electrode assembly inside the cell, to provide a path through which the cell is electrically connected to an outside.

Hereinafter, it is assumed that, for convenience of illustration, the first cell 10 includes a (1-1)-th electrode terminal 11 and a (1-2)-th electrode terminal 12, and the (1-1)-th and (1-2)-th electrode terminals 11 and 12 are respectively positive and negative electrodes. Similarly, it is assumed that the second cell 20 includes a (2-1)-th electrode terminal 21 and a (2-2)-th electrode terminal 22, and the (2-1)-th and (2-2)-th electrode terminals are respectively positive and negative electrodes.

As shown in FIG. 1, the plurality of battery cells 10 and 20 may be arranged in a predetermined direction while facing each other. The cells 10 and 20 may be electrically connected to each other.

The plurality of battery cells 10 and 20 may be connected in series or parallel to each other. In order to perform a serial connection, as shown in FIG. 1, the electrode terminals 11, 12, 21 and 22 of the cells 10 and 20 may be arranged so that the positive and negative electrodes alternately cross each other.

For example, in order to perform the serial connection of the first and second cells 10 and 20, the (1-1)-th electrode terminal 11 of the first cell 10 and the (2-2)-th electrode terminal 22 of the second cell 20 may be connected to each other through the busbar module 100.

Hereinafter, the case where the first and second cells 10 and 20 are arranged while facing each other and connected in series by the busbar module 100 will be mainly described.

As described above, in order to perform the serial connection of the first and second cells 10 and 20, the (1-1)-th electrode terminal 11 of the first cell 10 and the (2-2)-th electrode terminal 22 of the second cell 20 may be electrically connected to each other.

To this end, the busbar 110 according to this embodiment is formed in the shape of a plate made of a conductive material. The busbar 110 may include a first mounting portion 111 mounted on the (1-1)-th electrode terminal 11, and a second mounting portion 112 mounted on the (2-2)-th electrode terminal 22.

The mounting portion 111 or 112 may have a shape corresponding to that of the electrode terminal 11 or 22 so as to be stably mounted on the electrode terminal 11 or 22. For example, the mounting portion 111 or 112 may have a concave shape that can be engaged with the convex electrode terminal 11 or 22.

As shown in FIGS. 1 to 5, a (1-1)-th guide groove 11-1 that extends in the width direction of the cell 10 may be formed in one surface of the (1-1)-th electrode terminal 11 of the first cell 10. The busbar 110 may include a first guide portion 113 that protrudes inside the first mounting portion 111 to be slidingly fastened to the (1-1)-th guide groove 11-1.

Symmetrically, a (2-2)-th guide groove 22-1 that extends in the width direction of the cell 20 may be formed in one surface of the (2-2)-th electrode terminal 22 of the second cell 20. The busbar 110 may include a second guide portion 114 that protrudes inside the second mounting portion 112 to be slidingly fastened to the (2-2)-th guide groove 22-1.

For example, the busbar module 100 according to this embodiment connects the (1-1)-th electrode terminal 11, which is the positive electrode of the first cell 10, and the (2-2)-th electrode terminal 22, which is the negative electrode of the second cell 20, to each other in order to achieve the serial connection of the plurality of cells 10 and 20. The cells 10 and 20 may be connected in series to each other in such a manner that the mounting portions 111 and 112 are mounted on the electrode terminals 11 and 22 through the guide portions 113 and 114 slidingly fastened to the guide grooves 11-1 and 22-1 formed in the electrode terminals 11 and 22, respectively.

As shown in FIGS. 1 to 5, the busbar module 100 may be preferably inserted in the direction (arrow direction) in which the guide portions 113 and 114 are slidingly fastened to the guide grooves 11-1 and 22-1, respectively. If the busbar module 100 were to be inserted in the opposite direction, the fastening may not be relatively easy due to interference with the other electrode terminals 12 and 21.

The busbar 110 may further include a stopping portion 115 or 116 formed at an end of the mounting portion 111 or 112 such that the sliding fastening of the guide portion 113 or 114 to the guide groove 11-1 or 22-1 is halted. For example, the stopping portion 115 or 116 may be formed in a step shape at the end of the mounting portion 111 or 112.

As the front end of the mounting portion 111 or 112 approaches to the electrode terminal 11 or 22, the guide portion 113 or 114 may be slidingly fastened to the guide groove 11-1 or 22-1. The sliding fastening may be halted by the stopping portion 115 or 116 positioned at the end of the mounting portion 111 or 112.

Figure 6:
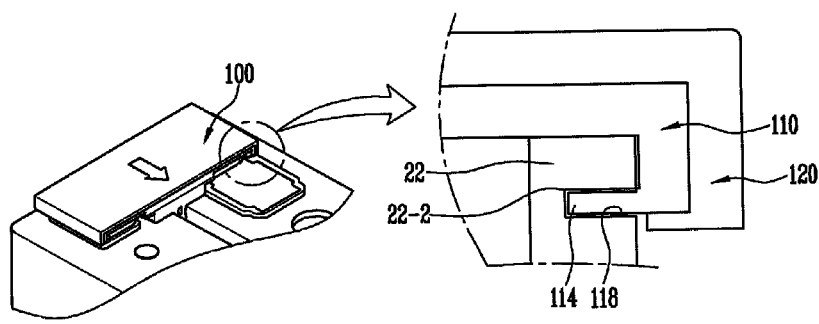
FIG. 6 illustrates a partial enlarged view showing the state in which the busbar module is mounted to the cells according to the embodiment.

FIG. 6 illustrates a partial enlarged view showing the state in which the busbar module 100 is mounted to the cells 10 and 20 according to the embodiment. As shown in FIG. 6, fixing projections 117 and 118 may be respectively formed on the guide portions 113 and 114 of the busbar 110.

Accordingly, after the guide portions 113 and 114 are slidingly fastened to the respective guide grooves 11-1 and 22-1, the arbitrary separation of the busbar module 100 may be prevented.

As shown in FIG. 6, fixing projections protruding into the guide grooves 11-1 and 22-1 may be formed on the electrode terminals, corresponding to the fixing projections 117 and 118 of the guide portions 113 and 114, respectively. The fixing projections may enable the busbar module 100 to be more firmly fixed to the electrode terminals.

An additional battery cell may be arranged in parallel to the first and second cells in order to increase power. When a third cell is additionally arranged while facing the second cell 20, the (2-1)-th electrode terminal 21 of the second cell 20 may be connected to a (3-2)-th electrode terminal that is a negative electrode of the third cell in order to achieve the serial connection of the second and third cells.

The busbar module may also be applied to the serial connection of the second and third cells. A busbar module may connect the cells in series to each other by being mounted on the electrode terminals of the second and third cells through the guide portions slidingly fastened to the guide grooves formed in the second and third cells.

The busbar module for connecting the second cell 20 and the third cell to each other may be configured identically to the busbar module 100 for connecting the first and second cells 10 and 20 to each other, except the inserting direction of the busbar module (not shown) may be changed to be opposite to that of the busbar module 100. Accordingly, a detailed description thereof will not be repeated.

As described above, the busbar 110 according to this embodiment provides a sliding fastening method through the guide portions 113 and 114 respectively corresponding to the guide grooves 11-1 and 22-1 formed in the electrode terminals 11 and 22.

Accordingly, it may possible to perform a convenient serial connection between cells without any problem of deterioration of weldability between different kinds of metals.

As shown in FIGS. 1 to 5, the insulating portion 120 according to this embodiment may have an accommodating groove 122 for accommodating the busbar 110.

The accommodating groove 122 may have a shape corresponding to the busbar 110, and the busbar 110 may be accommodated in insulating portion 120 by being inserted into the accommodating groove 122 previously formed in the insulating portion 120. According to another implementation, the busbar 110 may be accommodated in the insulating portion 120 by an insert injection method.

The insulating portion 120 may be made of an insulative material, to prevent electricity flowing through the busbar 110 from being flowed therethrough. The busbar 110 may be coupled to the electrode terminals 11 and 22 in a state in which the busbar 110 is accommodated in the accommodating groove 122 formed in the insulating portion 120.

The insulating portion 120 may perform not only a function of insulating the busbar 110 but also a function of facilitating the coupling between the busbar 110 and the electrode terminals 11 and 22.

The insulating portion 120 according to this embodiment may include a horizontal member 124 and a spacer 126, which align the first and second cells 10 and 20 connected in series to each other.

Figure 7:
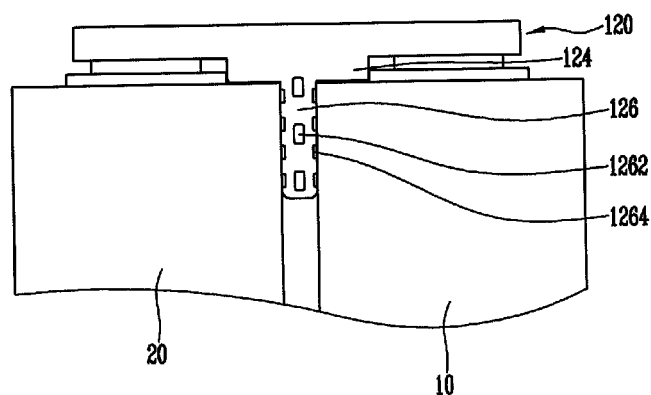
FIG. 7 illustrates a left side view showing the state in which the busbar module is mounted to the cells according to the embodiment.

FIG. 7 illustrates a left side view showing the state in which the busbar module 100 is mounted to the cells 10 and 20 according to the embodiment. As shown in FIG. 7, the horizontal member 124 may be formed to extend downward from the insulating portion 120 and may guide the horizontal alignment of the cells. The horizontal member 124 may be formed in a step shape to contact the top surfaces of the first and second cells 10 and 20.

When the busbar module 100 is mounted to the electrode terminals 11 and 22 of the cells 10 and 20, the horizontal member 124 may contact the top surface of the first cell 10, on which the (1-1)-th electrode terminal 11 is placed, and the top surface of the second cell 20, on which the (2-2)-th electrode terminal 22 is placed, to allow the heights of the first and second cells 10 and 20 to be equally maintained, thereby guiding the horizontal alignment of the cells.

As shown in FIGS. 1 to 7, the horizontal member 124 may be positioned between the first and second mounting portions 111 and 112 of the busbar 110. The horizontal member 124 may be flat.

The spacer 126 may be formed to extend vertically downward from the horizontal member 124. The spacer 126 may maintain a predetermined interval between the cells 10 and 20 connected in series to each other.

The spacer 126 may be formed to extend downward from the horizontal member 124, to be positioned between the first and second mounting portions 111 and 112 of the busbar 110. When the busbar module 100 is mounted to the electrode terminals 11 and 22 of the cells 10 and 20, the spacer 126 may contact one surface of the first cell 10 and one surface of the second cell 20, to ensure a desired distance between the cells.

A desired spacing distance between the cells 10 and 20 may be ensured by the spacer 126, such that ventilation may be smoothly made between the cells.

In order to allow the ventilation between the cells to be more smoothly made, as shown in FIG. 7, through-holes 1262 extending in the width direction of the cell may be formed inside the spacer 126, and through-grooves 1264 extending in the width direction of the cell may also be formed on an outer surface of the spacer 126.

The horizontal member 124 and the spacer 126, which constitute the insulating portion 120, may be integrally formed of the same insulative material. The busbar 110, as described above, may be accommodated in the integrally formed insulating portion 120 by the insert injection method.

Although it has been described in this embodiment that, for convenience of illustration, the horizontal member 124 for guiding the horizontal alignment of the cells contacts the top surfaces of the first and second cells, and the spacer 126 for maintaining the interval between the cells contacts one surface of the first and second cells, in other implementations, the contact may be temporarily made as the busbar module 100 is slidingly fastened to the electrode terminals 11 and 22, and at least one of the horizontal member 124 and the spacer 126 may not contact the cells at the time when the sliding fastening of the busbar module 100 is finished.

By way of summation and review, serial connection of battery cells in a battery cell assembly may be performed through use of a separate connecting member. The positive electrode of any one of a pair of battery cells adjacent to each other in the battery cell assembly may be connected to the negative electrode of the another battery cell through the connecting member. However, the use of a connecting member may involve an inconvenient process for assembling the power supply device.

For example, a terminal unit of a cap assembly may include positive and negative electrode terminals connected to a collector plate, a terminal plate coupled to the positive and negative electrode terminals to connect a busbar to the positive and negative electrode terminals, and the like. The coupling between the positive (or negative) electrode terminal and the terminal plate or the coupling between the terminal plate and the busbar may be performed through laser welding.

However, the positive and negative electrode terminals are generally made of different metals from each other. Hence, if the terminal plate is made of any one of the two different metals, the portion at which the welding between the different kinds of metals is performed may have low weldability, and therefore, the bonding strength at the portion may be relatively weakened.

For example, the positive electrode terminal may be made of aluminum, and the negative electrode terminal may be made of copper. If the terminal plate is made of any one of the aluminum and the copper, the terminal plate is made of a material different from that of any one of the positive and negative electrode terminals, and the portion at which the welding between the different kinds of metals is performed may have a different melting point. Therefore, the weldability at the portion may be deteriorated through general laser welding.

Similarly, when terminal plates are respectively made of metals equal to those of the positive and negative electrode terminals, the weldability between each terminal and the corresponding terminal plate can be improved. However, when a busbar for connecting between the terminal plates is welded, the deterioration of the weldability between the different kinds of metals may occur in at least one portion.

In order to prevent the deterioration of the weldability between the different kinds of metals, a nut fastening method may be considered. However, the nut fastening method causes an increase in the number of processes.

In addition, when a busbar made of aluminum or copper is exposed to an outside, there exists a risk in terms of safety.

In contrast, the embodiments provide a busbar module that may perform a convenient serial connection between cell terminals without any problem of deterioration of weldability between different kinds of metals and that may prevent in advance the occurrence of a safety accident due to the external exposure of the busbar.

As described above, the insulating portion according to embodiments may prevent in advance the occurrence of a safety accident caused by the external exposure of the busbar, and may guide the fastening of the busbar 110 to the electrode terminals. In addition, it may be possible to increase a cooling effect through the horizontal alignment of the cells and through the smooth ventilation between the cells.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A busbar module that connects a first cell and a second cell adjacent to the first cell, arranged in a first direction and each having first and second electrode terminals spaced apart in a second direction normal to the first direction, the busbar module comprising:

a busbar that electrically connects a first electrode terminal of the first cell and a second electrode terminal of the second cell to each other; and an insulating portion that accommodates the busbar, the insulating portion including a spacer that extends between and contacts side surfaces of the first cell and the second cell facing each other;
the busbar including a first recessed mounting portion, the first recessed mounting portion and a protruding shape of the first electrode terminal having interfitting shapes and a second recessed mounting portion, the second recessed mounting portion and a protruding shape of the second electrode terminal having interfitting shapes, wherein:
the busbar further includes:
a first guide portion extending inwardly from a side of the first recessed mounting portion to engage a first guide groove at an outer side of the first electrode terminal that is farthest from the second electrode terminal, the first guide groove extending in the side of the first electrode terminal in the second direction, and
a second guide portion extending inwardly from a second side portion of the second recessed mounting portion to engage a second guide groove at a side of the second electrode terminal that is farthest from the first electrode terminal, the second guide groove extending in the side of the second electrode terminal in the second direction, such that the busbar is coupleable with the first and second electrode terminals by sliding in a direction parallel to the second direction.

2. The busbar module as claimed in claim 1, wherein the insulating portion further includes a horizontal member that contacts a top surface of the first cell and a top surface of the second cell between the first electrode terminal of the first cell and the second electrode terminal of the second cell.

3. The busbar module as claimed in claim 2, wherein the spacer extends from the horizontal member to maintain a predetermined interval between the first cell and the second cell.

4. The busbar module as claimed in claim 3, wherein the spacer includes at least one through-hole that extends through the spacer from an outside of the first cell and the second cell to a space between the first cell and the second cell defined by the predetermined interval.

5. The busbar module as claimed in claim 3, wherein the spacer includes at least one through-groove that extends on an outer surface of the spacer from an outside of the first cell and the second cell to an space between the first cell and the second cell defined by the predetermined interval.

6. The busbar module as claimed in claim 3, wherein the spacer is positioned between the first mounting portion and the second mounting portion.

7. The busbar module as claimed in claim 1, wherein the busbar further includes a stopping portion at an end of at least one of the first mounting portion and the second mounting portion to limit sliding of the first guide portion relative to the first guide groove and sliding of the second guide portion relative to the second guide groove.

8. The busbar module as claimed in claim 1, wherein at least one surface of the first guide portion or the second guide portion includes a plurality of fixing projections.

9. The busbar module as claimed in claim 2, wherein the insulating portion includes a covering portion that covers an outer surface of the busbar.

10. The busbar module as claimed in claim 9, wherein the busbar is in an accommodating groove between the covering portion and the horizontal member.

11. A battery module, comprising:
at least a first cell and a second cell arranged in a first direction, the first cell and the second cell having side surfaces facing each other, the first cell and the second cell each having first and second electrode terminals spaced apart in a second direction, the first electrode terminal including a first guide groove at an outer side of the first electrode terminal facing away from the second electrode terminal, the first guide groove extending in the second direction, the second direction being perpendicular to the first direction and parallel to a top surface of the first cell, and the second electrode terminal including a second guide groove at an outer side of the second electrode terminal facing away from the first electrode terminal, the second guide groove extending in the second direction, and
a busbar module connecting a first electrode terminal of the first cell and a second electrode terminal of the second cell, the busbar module including:
a busbar that electrically connects the first electrode terminal of the first cell and the second electrode terminal of the second cell to each other, the busbar including a first mounting portion including a first concave portion and a first guide portion extending inwardly from a side of the first mounting portion to engage the first guide groove, and a second mounting portion including a second concave portion and a second guide portion extending inwardly from a second side portion of the second mounting portion to engage the second guide groove, such that the busbar module is coupleable with the first cell and the second cell by sliding the busbar in the second direction, and
an insulating portion coupled with the busbar, the insulating portion including a spacer that extends between the first cell and the second cell and contacts the side surface of the first cell and the side surface of the second cell.

12. The battery module as claimed in claim 11, wherein the insulating portion further includes a horizontal member that extends in the first direction between the first electrode terminal of the first cell and the second electrode terminal of the second cell and contacts the top surface of the first cell and the top surface of the second cell.

13. The battery module as claimed in claim 12, wherein the spacer extends from the horizontal member in a third direction perpendicular to the first direction and the second direction to maintain a predetermined interval between the first cell and the second cell.

14. A busbar module, comprising:
a busbar made of a conductive material, the busbar including first and second guide portions at opposite ends of the busbar in a first direction, a middle portion that is stepped from a bottom of the busbar, and first and second recessed mounting portions at the bottom of the busbar between the middle portion and the first guide portion and between the middle portion and the second guide portion, respectively, such that the first recessed mounting portion and the second recessed mounting portion are spaced apart from each other in a first direction and extend in the busbar in a second direction, wherein the first and second guide portions extend inwardly from the ends of the busbar in the first direction, and
an insulating portion coupled with the busbar, the insulating portion including an upper insulating portion that directly contacts and entirely covers a top surface of the busbar, a lower insulating portion that covers the middle portion of the bottom of the busbar, and a spacer that extends downwardly from the lower insulating portion in a third direction, perpendicular to the first direction and the second direction away from the bottom of the busbar, the spacer including at least one through-hole that extends through the spacer in the second direction or at least one through-groove that extends on an outer surface of the spacer in the second direction, the spacer being made of an insulating material.

* * * * *